United States Patent [19]

Grocke

[11] Patent Number: 4,678,925
[45] Date of Patent: Jul. 7, 1987

[54] DASHBOARD LIGHTING ADJUSTMENT FOR A MOTOR VEHICLE

[76] Inventor: Diethelm Grocke, Schnieglinger Str. 132, Nuremberg 90, Fed. Rep. of Germany, 8500

[21] Appl. No.: 818,330

[22] Filed: Jan. 13, 1986

[30] Foreign Application Priority Data

Jan. 12, 1985 [DE] Fed. Rep. of Germany ....... 3500918

[51] Int. Cl.$^4$ .............................................. H02G 3/00
[52] U.S. Cl. ............................ 307/10 LS; 307/10 R; 315/82; 200/61.35; 340/76
[58] Field of Search ......................... 307/10 R, 10 LS; 340/76, 79, 92; 362/61, 62, 211, 212; 315/82, 77, 83, 79, 84, 80; 200/61.30, 61.43, 61.35, 61.44, 61.54

[56] References Cited

U.S. PATENT DOCUMENTS

| | | | |
|---|---|---|---|
| 2,948,832 | 8/1960 | Hollins | 200/61.35 X |
| 3,381,170 | 4/1968 | Franz | 315/83 |
| 3,604,975 | 9/1971 | Suzuki et al. | 200/61.54 X |
| 3,702,415 | 11/1972 | Schultz | 315/83 X |
| 3,704,446 | 11/1972 | Walter | 315/77 X |
| 4,009,363 | 2/1977 | Binegar | 307/10 LS X |
| 4,037,197 | 7/1977 | County | 340/76 X |
| 4,105,898 | 8/1978 | Farler et al. | 315/82 X |
| 4,337,400 | 6/1982 | Hahm | 307/10 LS |
| 4,464,604 | 8/1984 | Hillstrom et al. | 315/77 X |
| 4,495,444 | 1/1985 | Thomas | 307/10 LS X |

Primary Examiner—William M. Shoop, Jr.
Assistant Examiner—Shik Luen Paul Ip
Attorney, Agent, or Firm—Holman & Stern

[57] ABSTRACT

An electrical switching system for adjusting the brightness of the dashboard lights of a motor vehicle includes a switch provided with a switch lever, for switching between low beam and high beam. Improvements are made whereby the brightness and dazzle-free character of the dashboard lighting can be adjusted with regard to the situation of low beam or high beam. This is achieved in that a switch between brighter dashboard lighting and less bright dashboard lighting is provided which is associated with a switch lever which can be moved to "high beam" and "low beam" positions. Dazzling of the driver due to excessively bright dashboard lighting, and lack of visibility due to inadequately bright dashboard lighting are avoided.

2 Claims, 1 Drawing Figure

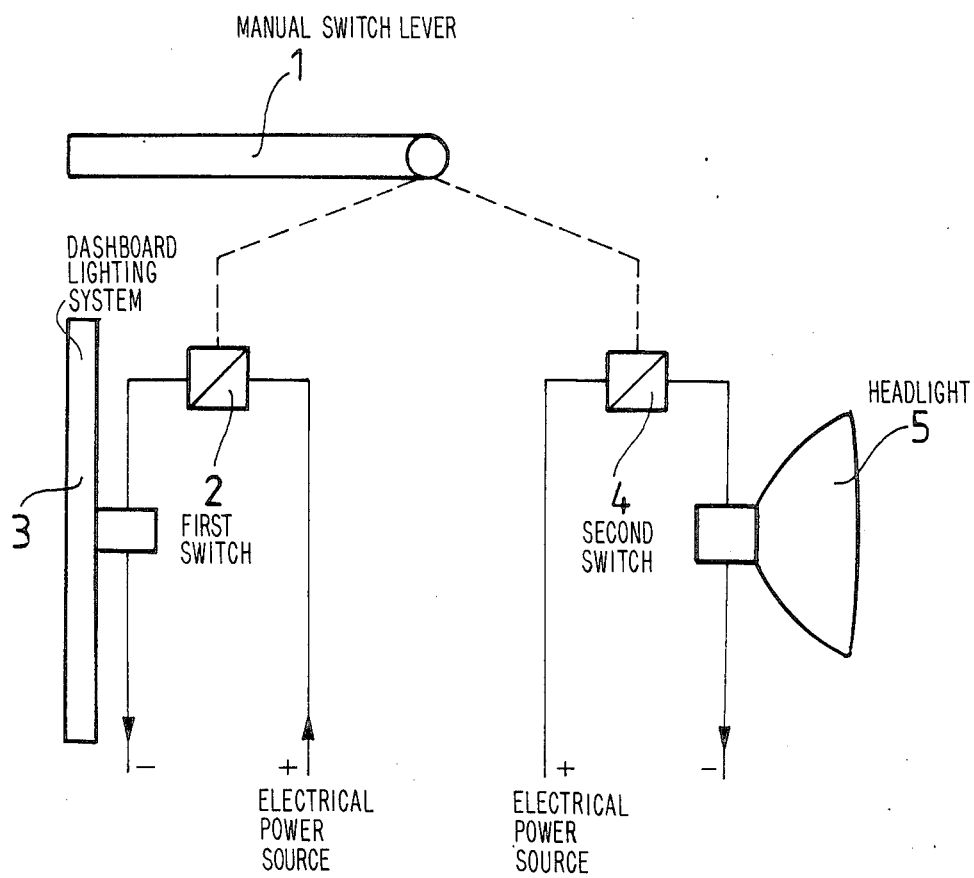

DASHBOARD LIGHTING ADJUSTMENT FOR A MOTOR VEHICLE

BACKGROUND OF THE INVENTION

The invention relates to an electrical switching system for adjusting the brightness of the dashboard lights of a motor vehicle, said switching system comprising a switch provided with a switch lever, for switching between bright and dim light (low beam and high beam settings).

In a known switching system of this type which is employed commerically, the dashboard lights can be continuously adjusted between dark and maximum brightness states by means of a rotary knob. The brightness of the dashboard light at a given setting does not depend on whether the headlights of the vehicle are set to low beam or high beam (dim or bright). The driver of a motor vehicle expects the illumination and light conditions to provide illumination which is dazzle-free and yet sufficient for good visibility. These opposing conditions are not satisfactorily fulfilled with the dashboard lights under the known arrangement, for both low beam and high beam situations.

SUMMARY OF THE INVENTION

The underlying problem of the invention is thus to devise a switching system of the type described initially supra, wherein the brightness and freedom from dazzle of the dashboard lighting is improved with regard to adaptability to low beam and high beam situations. The inventive switching system which solves this problem is characterized in that a switch between a brighter dashboard lighting state and a less bright dashboard lighting state is provided which is associated with a switch lever which can be moved to "high beam" and "low beam" positions.

When, under high beam conditions, the driver's eyes are accustomed to more brightness, the dashboard indicators, e.g. the speedometer, tachometer, and clock, are more brightly illuminated; and when the driver's eyes are adjusted to a lower level of brightness, in a low beam situation, the dashboard lighting is set to lower brightness. Thus [the driver] avoids being dazzled by dashboard lighting which is too bright and also avoids lack of visibility caused by inadequately bright dashboard lighting.

BRIEF DESCRIPTION OF THE DRAWING

The FIGURE illustrates a preferred embodiment of the invention, [in connection with] adjustment of the dashboard lights of a motor vehicle.

DETAILED DESCRIPTION OF THE INVENTION

According to the FIGURE, a manually operable switch lever 1 is swingably disposed and engages a switch 2 which is disposed in the electrical circuit of a dashboard lighting system 3. The switch lever 1 can be placed in the position shown or into a second position, wherewith it sets the switch 2 such that in the one instance the circuit of the dashboard lights is unaffected, whereby the brightness of the dashboard lights is undiminished by the switch 2; and in the other position of switch 2 the dashboard lights are set to lower brightness. Via [another] switch 4, the switch lever 1 sets a headlight 5 to high beam (in the [abovementioned] first position), and to low beam (in the [abovementioned] second position). Thus, as seen from the above, the switch lever 1 simultaneously actuates switches 2 and 4 in switching from the low beam to the high beam setting. Also, an electrical power source, as seen in the drawing, supplies power respectively to the circuits containing switches 2 and 4, as is conventional and well-known.

Additional switch means may be provided in the electrical circuit of the dashboard lights, for adjusting the dashboard lighting; e.g., switch means which enable hand adjustment of the dashboard lights, via a rotary knob, in continuous fashion between darkness and maximum brightness.

I claim:

1. An illuminating system for a motor vehicle, comprising:
   headlamps which are selectively actuatable to selectively operate on low beam and high beam illumination;
   a dashboard illumination means which is adjustable between a first stage which produces relatively dim dashboard lighting, and a second stage which produces relatively bright dashboard illumination;
   a first switch means for switching said headlamps between said low beam and said high beam illumination;
   a second switch means for switching said dashboard illumination means between said first stage which produces relatively dim lighting and said second stage which produces relatively bright lighting;
   a manually operated control means for operating said first switch means and said second switch means in a single operation of said manually operated control means;
   whereby said low beam illumination is switched on along with said first stage which produces said dim dashboard illumination; and said high beam illumination is switched on along with the second stage which produces relatively bright dashboard illumination.

2. An illuminating system as claimed in claim 1, wherein said manually operated control means comprises a lever member selectively manually pivotable into a first position and into a second position.

* * * * *